UNITED STATES PATENT OFFICE.

GEORGE T. KOCH AND ALBERT L. STALLKAMP, OF HOMER, OHIO, ASSIGNORS TO THE OHIO FUEL SUPPLY COMPANY, OF PITTSBURGH, PENNSYLVANIA, A CORPORATION OF OHIO.

PROCESS FOR THE ACETYLATION OF HYDROCARBONS AND SUBSEQUENT RECOVERY OF THE PRODUCTS OF THE REACTION.

1,374,666.            Specification of Letters Patent.      Patented Apr. 12, 1921.

No Drawing.       Application filed November 24, 1920. Serial No. 426,165.

*To all whom it may concern:*

Be it known that we, GEORGE T. KOCH and ALBERT L. STALLKAMP, citizens of the United States, residing at Homer, in the county of Licking and State of Ohio, have invented certain new and useful Improvements in Processes for the Acetylation of Hydrocarbons and Subsequent Recovery of the Products of the Reaction; and we do hereby declare the following to be a full, clear, and exact description of the invention, such as will enable others skilled in the art to which it appertains to make and use the same.

Our invention consists in the novel features hereinafter described, and fully pointed out in the following description and claims.

Our invention consists in an improved process for the manufacture of amyl acetate or its homologues from chlorids of the paraffin hydrocarbons having more than one carbon atom. It is known that in the decomposition of the chlor-compounds of the paraffin series having more than one carbon atom, with an alkali acetate, in the presence of acetic acid, large volumes of cyclo-pentanes (amylenes) are formed, which greatly reduce the yield of amyl acetate. Our present invention is based upon our discovery that by the use of activated carbon, such as dorsite or batchite, as a catalyzer, in the presence of which a chlor-compound of the paraffin hydrocarbons is treated, the formation of cyclo-pentanes is materially decreased, and the yield of amyl acetate is greatly increased, a yield of approximately 75% of the theoretical (by weight) of amyl acetate, and even higher percentages being produced.

By the term activated carbon we mean a carbon which is vastly more porous than the substance which has heretofore been generally denominated charcoal. Activated carbon is ordinarily produced by heating carboniferous material to a high temperature, approximately 900° C., and subjecting it while so heated to the action of steam, the effect being to produce a carbon differing very greatly from the material previously referred to by the term charcoal and being very much more porous than any previously known charcoal. One form of this new substance activated carbon, which is called dorsite, is prepared conveniently from vegetable material, such as cocoanut shells. Another form of activated charcoal which we prefer to employ in carrying out our process, is termed batchite, and is obtained by treating hard coal at high temperature with steam in the manner previously described. We have discovered that by using activated carbon as a catalyzer in the manufacture of amyl acetate from paraffin hydrocarbons, a number of beneficial results are secured, which may be mentioned as follows:—

1. The marked increase in yield of amyl acetate;
2. The decrease in the formation of amylenes (cyclo-pentanes).

These two points of advantage might well be considered as one. As there is only a certain amount of amyl chlorid available in each charge of the autoclave, in which the operation takes place, naturally the greater the amount of this amyl chlorid which is decomposed to amylenes, the less there is to react with the alkali acetate, for example, to form amyl acetate. The important effect, therefore, of the activated carbon in the process is that it prevents decomposition of the amyl chlorid.

In carrying out our improved process, a charge is prepared consisting of a chlor-compound of a paraffin hydrocarbon, as for example chlor-pentane, with an alkali acetate, as for example sodium acetate, and activated carbon, preferably batchite, although dorsite or other form of activated carbon may be employed.

In preparing the charge, acetic acid may or may not be added, and in some instances lower cuts from previous runs may be added. That is to say, in conducting the process a run is made for the purpose of producing amyl acetate and the product is distilled. The fractions distilling over below 225° F. are considered "lower cuts" and a portion of these lower fractions may be advantageously used in preparing the charge for the next run of the process, as a solvent for the sodium acetate, the effect of this solvent being to aid the reaction in starting.

The charge, being prepared as above set forth, with or without acetic acid, or with or without lower cuts from previous runs, is placed in an autoclave and heated under a working pressure, which we prefer to keep at substantially 200 to 225 pounds per square inch, the charge being heated to a temperature of from 250° to 450° F., the charge being preferably stirred, or agitated, as by means of a mechanical stirrer with which the autoclave is provided, or otherwise. The charge must be heated to such a temperature as will cause the reaction to take place. I do not desire to be limited to any precise temperature or temperatures, but I have found the most satisfactory results obtained at temperatures between 250° and 450° F. Any other temperature which will insure the reaction may be employed. During the course of the reaction, hydrochloric vapors are formed in practice, although theoretically the formation of HCl is not involved in the reaction, which may be expressed as follows:

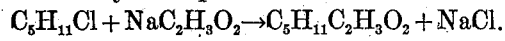
$C_5H_{11}Cl + NaC_2H_3O_2 \rightarrow C_5H_{11}C_2H_3O_2 + NaCl.$

In practice, however, hydrochloric acid vapors are formed and cause the pressure in the autoclave to rise to unnecessary limits. One theory as to the presence of these vapors is that they are due to the fact that it is never possible to remove all the free chlorin from the chlor-pentane, and it is equally impossible to entirely remove all the moisture from the sodium acetate, and that during the process of actelyation these traces of chlorin and moisture are released, with the result and formation of HCl vapors. Some HCl vapors are also formed by the decomposition of the amyl chlorid to amylene according to the following reaction

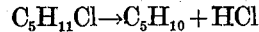
$C_5H_{11}Cl \rightarrow C_5H_{10} + HCl$

During the course of the reaction these hydrochloric acid vapors are drawn off from time to time to reduce the pressure within the autoclave and keep it within safe limits.

The esterified product is preferably removed from the autoclave by distilling it under the working pressure of from 200 to 225 pounds per square inch, the very last or highest boiling fractions of the product being removed by drawing a vacuum on the autoclave. The esterified product is condensed in any usual or well known manner. In carrying out our improved process, it is found that the activated carbon (batchite or dorsite, etc.) is not altered by or during the reaction, its function being merely that of a catalyzer, and it may be recovered from the residue in the autoclave by simple leaching.

What we claim and desire to secure by Letters Patent is:—

1. The herein described method of esterifying chlor-hydrocarbons of the paraffin series, which consists in heating the chlor-hydrocarbons with an alkali acetate in the presence of activated carbon as a catalyzing material, whereby the decomposition of amyl chlorid is prevented, and the yield of amyl acetate increased.

2. The herein described method of esterifying chlor-hydrocarbons of the paraffin series, which consists in heating the chlor-hydrocarbons with an alkali acetate, in the presence of batchite.

3. The herein described method of esterifying chlor-hydrocarbons of the paraffin series, which consists in heating the chlor-hydrocarbons with an alkali acetate, and with lower cuts from a previous esterification, in the presence of activated carbon.

4. The herein described method of esterifying chlor-hydrocarbons of the paraffin series, which consists in heating the chlor-hydrocarbons to from 250° to 450° F., with an alkali acetate, in the presence of batchite as a catalyzer.

5. The herein described method of esterifying chlor-hydrocarbons of the paraffin series which consists in heating the chlor-hydrocarbons to from 250° to 450° F., with an alkali acetate, in the presence of batchite as a catalyzer, and maintaining a pressure of from 200 to 225 pounds per square inch.

6. The herein described method of esterifying chlor-hydrocrabons of the paraffin series, which consists in heating the chlor-hydrocarbons with an alkali acetate under a pressure of from 200 to 250 pounds per square inch, in the presence of activated carbon, and with drawing the hydrochloric acid gases evolved.

7. The herein described method of esterifying chlor-hydrocarbons of the paraffin series, which consists in heating the chlor-hydrocarbons with an alkali acetate in the presence of activated carbon, and distilling off and condensing the esterified product to separate it.

8. The herein described method of esterifying chlor-hydrocarbons of the paraffin series, which consists in heating and stirring the chlor-hydrocarbons with an alkali acetate in the presence of activated carbon (batchite) under pressure of substantially 200 to 225 pounds per square inch, removing the hydrochloric gases evolved, separating the esterified product, by first distilling under the aforesaid pressure, and then continuing the distillation in vacuo for the recovery of the higher boiling fractions of the product.

9. The herein described method of esterifying chlor-hydrocarbons of the paraffin series, which consists in heating and stirring under pressure the chlor-hydrocarbons with sodium acetate, in the presence of batchite, under a pressure of from 200 to 250 pounds per square inch, and at a temperature of from 250° to 450° F., withdrawing the hydrochloric acid gases, distilling the product under the aforesaid pressure, and then continuing the distillation *in vacuo* for the recovery of fractions of higher boiling points.

In testimony whereof we affix our signatures.

GEORGE T. KOCH.
ALBERT L. STALLKAMP.